United States Patent Office 2,881,846
Patented Apr. 14, 1959

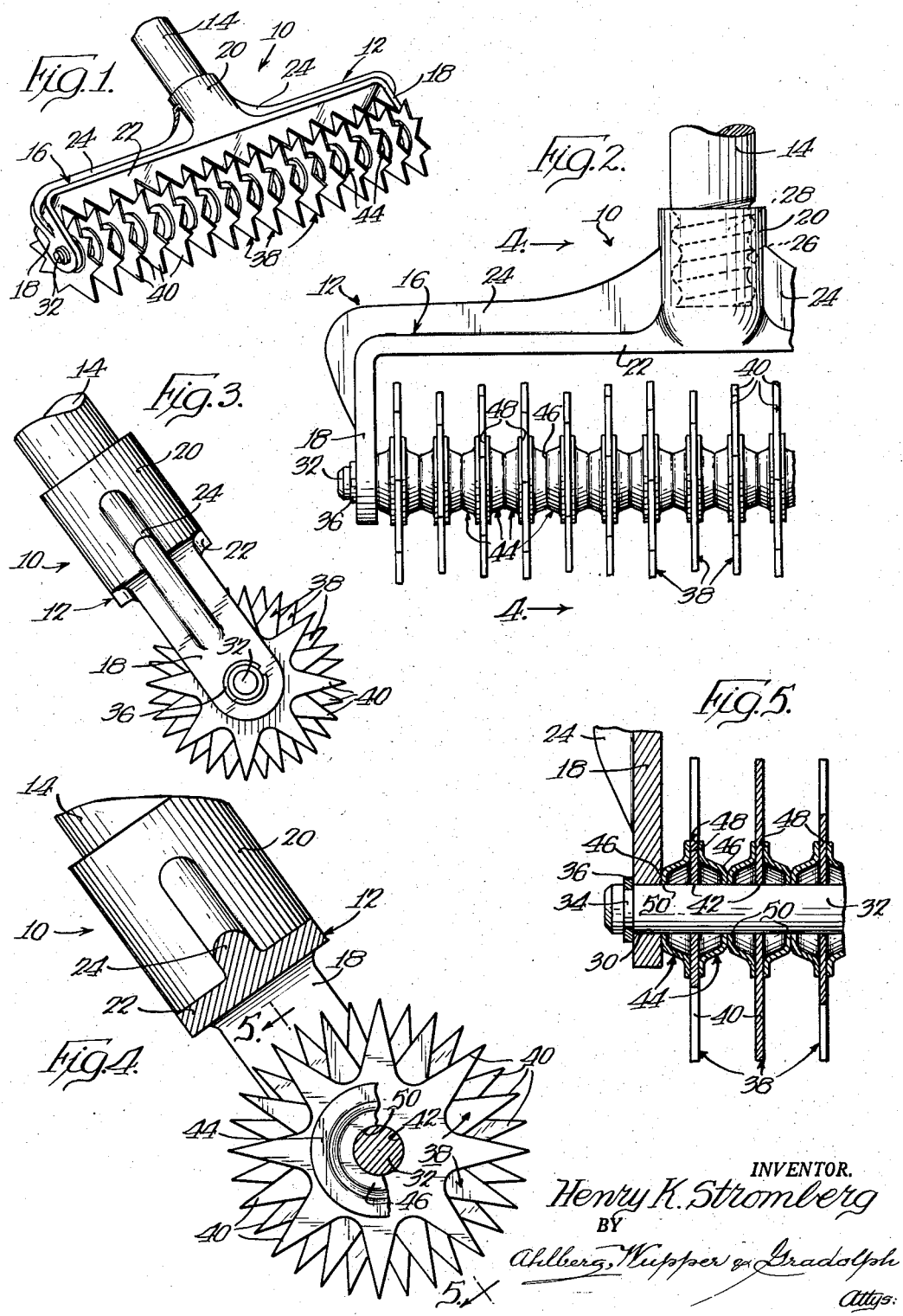

2,881,846

GARDEN TOOL

Henry K. Stromberg, Chicago, Ill., assignor of one-half to Frank J. Glacy, Chicago, Ill.

Application November 15, 1954, Serial No. 468,621

2 Claims. (Cl. 172—548)

The present invention relates to a garden tool, and in particular to a novel tool for working the soil by manual power.

Home owners and possessors of small gardens and small plots of land have need for a manually operable tool with which to work the soil about the bases of bushes, shrubs and other small plants from a standing position. Such tool would also be useful in loosening the soil in small bare patches in a lawn or other grassy area which needs reseeding, and in mulching. At present only a garden fork is generally available for such work and more often than not it is unhandy and spades up too much soil.

It is the principal object of the present invention to provide a novel tool which is useful in working the soil around and under bushes, shrubs, small plants, and the like, in bare patches on lawns and for mulching purposes.

Another object is to provide a novel garden tool having a frame on which are journalled individually rotatable soil working members or wheels.

Another object is to provide a novel garden tool made from a plurality of similar parts which can be manufactured in quantity and assembled easily and at low cost.

Other objects and advantages will become apparent from the following description taken in conjunction with the accompanying drawing, wherein:

Fig. 1 is a perspective view of the head or working end of the garden tool of this invention;

Fig. 2 is a fragmentary elevational view taken with the handle extending vertically;

Fig. 3 is an end elevational view;

Fig. 4 is an enlarged cross sectional view taken substantially along the line 4—4 of Fig. 2, looking in the direction of the arrows, and showing the garden tool in operative position; and Fig. 5 is a fragmentary cross sectional view taken substantially along the line 5—5 of Fig. 4, looking in the direction of the arrows.

The garden tool of the present invention, indicated generally by the reference character 10, comprises a head 12 to which is removably secured a handle 14 which may be made of wood, aluminum, tubular steel, or the like, and which is approximately as long as the handle of the conventional garden rake.

The tool head includes a U-shaped frame 16, cast from iron, aluminum or aluminum alloys, and formed with downwardly and forwardly extending arms 18 and a hollow boss 20 integral with the back or transverse part 22 of the frame. Decorative and reinforcing ribs 24 extend away from the boss 20 toward the outer ends of the frame and blend into the arms 18, as shown. The boss 20 is provided with internal threads 26 to receive the external threads 28 on the end of the handle 14. This arrangement for securing the handle 14 to the head 12 is illustrative only and other means may be employed.

The outer ends of the two arms 18 are provided with coaxial holes or apertures 30 through which project the opposite ends of an axle 32. As seen clearly in Fig. 5, the axle end projects beyond the outer face of the arm 18 and, adjacent the face, is formed with an annular groove 34 in which is retained a C-clip 36 to inhibit axial movement of the axle.

Between the arms 18 is a plurality of plate-like soil working members or wheels 38 which are most clearly seen in Fig. 4. Each of these members is provided with a central aperture 42 to enable it to be journalled on the axle 32 and with a plurality, shown to be eight, of pointed tips 40 which, as the garden tool 10 moves over the soil, digs into the soil to loosen it. The points 40 on the star-wheel 38 are extremely long compared with the diameter, being greater than one-half of the dimension of a radius. For example, in a member measuring 2½ inches from tip to tip, the depth of each point 40 is approximately ¾ inch. This insures that the tool will work the soil to the proper depth and that it will have a very substantial loosening effect.

In the embodiment of the tool shown in the drawing, there are sixteen star-shaped wheels 38 which are individually mounted on the axle 32 and are rotatable relative thereto and relative to each other so that a proper working of the soil can be effected. These star-wheels 38 are separated from each other and from the frame arms 18 by a plurality of cup-shaped spacers 44 having flat inner and outer, oppositely facing bearing surfaces 46 and 48, respectively. These cup-shaped spacers are provided with central apertures 50 to enable them to be individually rotatably mounted on the axle 32 so that they may rotate relative to each other and, if necessary, relative to the star-wheels 38.

A single cup-shaped spacer 44 is positioned between the end wheel 38 and the inner face of the arm 18 with the bearing surface 46 riding against the inner face of the arm 18, and the bearing surface 48 against the outer face of the end wheel 38. A pair of spacers 44 is disposed between adjacent star-wheels 38 with the bearing surfaces 46 of the pair of spacers 44 abutting each other, and the outer surfaces 48 bearing against the adjacent faces of the wheels 38. The spacers 44 properly space the wheels 38 from each other and from the forwardly and downwardly extending arms of the frame and insure that the wheels 38 will rotate relative to each other and to the axle 32.

The tool is used in approximately the position shown in Figs. 1, 3 and 4 with the tips 40 of the star-wheels 38 engaging the ground. Inasmuch as they are individually rotatable, they may assume an indefinite number of positions relative to each other, some of which are indicated in Figs. 3 and 4. This insures that the tool will move fairly smoothly over the ground under the pushing action of the gardener and will be pressed into the ground the necessary distance to loosen the soil and to provide a fertile area for the reception of seed in the case of a bare spot being reseeded, or to loosen the soil around the bases of plants, shrubs, hedges and the like, so that the ground can be fertilized and watered. It will be appreciated, therefore, that this tool, which is of very simple construction, fully attains all of the objectives which were claimed for it.

It is preferred that the star-wheels 38 and spacers 44 be suitably finished, as by cadmium plating, to prevent rusting.

It will also be observed that it is a rather easy tool to package for shipment inasmuch as the handle 14 may readily be separated from the frame 16 and the two placed in a package side by side with the back 22 of the frame aligned parallel with the long dimension of the handle 14.

While a preferred embodiment of the garden tool constituting this invention has been shown and described, it will be apparent that numerous modifications and variations thereof may be made without departing from the underlying principles of the invention. It is, therefore, desired by the following claims to include within the scope of the invention all such variations and modifications by which substantially the results of this invention may be obtained through the use of substantially the same or equivalent means.

What is claimed as new and desired to be secured by United States Letters Patent is:

1. A garden tool for working the soil comprising in combination, a one-piece U-shaped frame having downwardly and forwardly extending arms when the tool is in operative position, a horizontally disposed axle mounted in the outer and free ends of said arms, a plurality of relatively closely spaced star shaped plate-like soil working members journaled on said axle to rotate freely thereon and relative to each other and each having a plurality of radial projections thereon engageable in the soil, and a plurality of hollow cup-shaped one piece metal spacers journaled on said axle to space said members along said axle, each of said cup-shaped spacers having a radially extending base portion with an aperture therein receiving said axle, a frusto conical wall portion spaced from said axle, and a radially extending flange portion arranged parallel to said base portion, said base portion and said flange portion providing respectively oppositely facing radially inner and outer bearing surfaces, adjacent soil working members being spaced from each other by a pair of spacers having abutting inner bearing surfaces and their outer bearing surfaces bearing against the adjacent faces of said members to permit rotation of said soil working members relative to said spacers, whereby said members may rotate on said axle relative to said frame, to each other, and to said spacers.

2. A garden tool for working the soil comprising in combination, a one piece U-shaped frame having downwardly and forwardly extending arms when the tool is in operative position, aligned apertures in the lower and forward ends of said arms, an axle extending through said apertures, means on said axle and abutting the outer faces of said arms to inhibit axial movement of said axle, a plurality of relatively closely spaced star-shaped plate-like soil working wheels journaled on said axle to rotate freely thereon and relative to each other and each having a plurality of projections thereon engageable in the soil, and a plurality of hollow cup-shaped one piece metal spacers journaled on said axle to space said wheels along said axle, each of said cup-shaped spacers having a radially extending base portion with an aperture therein receiving said axle, a frusto conical wall portion spaced from said axle, and a radially outwardly extending flange portion arranged parallel to said base portion, said base portion and said flange portion providing respectively oppositely facing radially inner and outer bearing surfaces, said inner bearing surfaces having a smaller diameter than said outer bearing surfaces, adjacent wheels being spaced from each other by a pair of spacers having abutting inner surfaces and their outer bearing surfaces bearing against the adjacent faces of said wheels to permit rotation of said wheels relative to said spacers, each of said end wheels being spaced from the adjacent arm by a single spacer having its inner bearing surface bearing against the inner face of said arm and its opposite bearing surface bearing against the outer face of said end wheel, whereby said wheels may rotate on said axle relative to said frame, to each other, and to said spacers.

References Cited in the file of this patent

UNITED STATES PATENTS

| | | |
|---|---|---|
| 39,389 | Ernst | Aug. 4, 1863 |
| 559,838 | Black | May 12, 1896 |
| 1,046,921 | White | Dec. 10, 1912 |
| 1,081,437 | De Long | Dec. 16, 1913 |
| 1,486,053 | Stewart | Mar. 4, 1924 |
| 1,827,001 | Englund | Oct. 13, 1931 |
| 2,022,335 | Bernthal | Nov. 26, 1935 |
| 2,253,391 | Ohlendorf | Aug. 19, 1941 |